United States Patent [19]

Rogowski

[11] Patent Number: 4,981,243

[45] Date of Patent: Jan. 1, 1991

[54] AUDIO EQUIPMENT CARRIER ASSSEMBLY FOR HANDLEBARS

[76] Inventor: Anthony J. Rogowski, 2721 Glenview, Royal Oak, Mich. 48073

[21] Appl. No.: 341,695

[22] Filed: Apr. 21, 1989

[51] Int. Cl.⁵ .......................... B62J 11/00; B62J 7/06
[52] U.S. Cl. .................................. 224/41; 224/30 A; 224/36; 224/901
[58] Field of Search ............... 224/30 R, 30 A, 32 R, 224/35, 36, 39, 41, 42.45, 901, 910, 42; 455/344, 346, 347–349, 350; 381/205, 188; 248/205.2, 309.1

[56] References Cited

U.S. PATENT DOCUMENTS

| | | | |
|---|---|---|---|
| 2,588,671 | 3/1952 | Tringali | 224/30 R |
| 3,380,698 | 4/1968 | Goldberg et al. | 224/30 A |
| 3,598,295 | 8/1971 | Seegers | 224/41 |
| 4,036,464 | 7/1977 | Olson | 381/188 |
| 4,535,870 | 8/1985 | Lindsay | 381/188 |
| 4,596,370 | 6/1986 | Adkins | 224/41 |
| 4,610,054 | 9/1986 | Malian | 248/205.2 |
| 4,754,901 | 7/1988 | Villanueva et al. | 224/30 A |
| 4,870,702 | 9/1989 | Azzouni | 455/347 |

Primary Examiner—Henry J. Recla
Assistant Examiner—Keith Kupferschmid
Attorney, Agent, or Firm—Lynn E. Cargill

[57] ABSTRACT

An audio equipment carrier assembly to be mounted on the handlebars or other like support members of various two and three wheel vehicles. The preferred embodiment includes a carrier assembly body adapted to receive and contain a Walkman-style personal radio having headphones which are very popular. Bicyclists and the like which desire to listen to music while riding may use the equipment carrier of the present invention to hold the radio or other audio equipment on the front of the bicycle while wearing the headphones for the equipment, which is connected to the audio source.

8 Claims, 2 Drawing Sheets

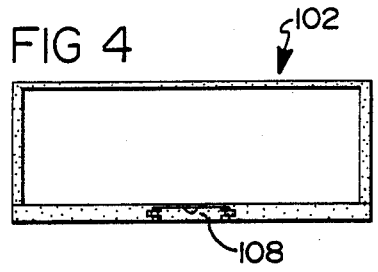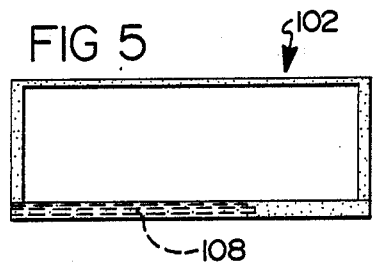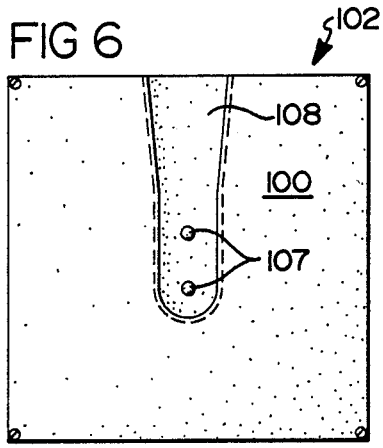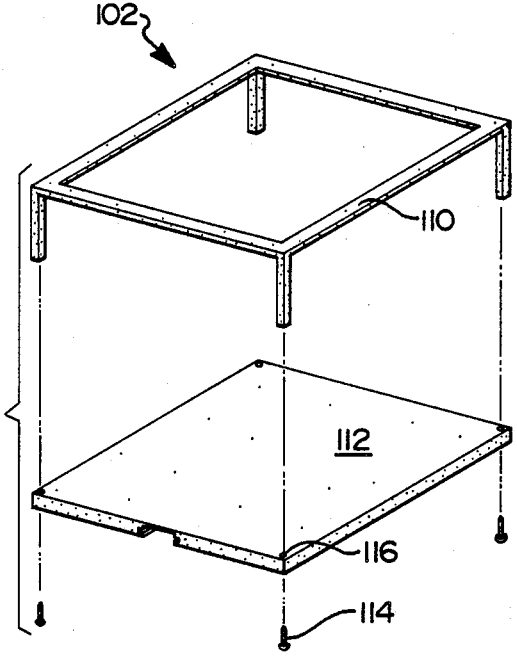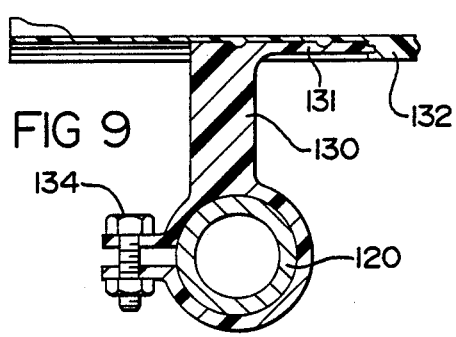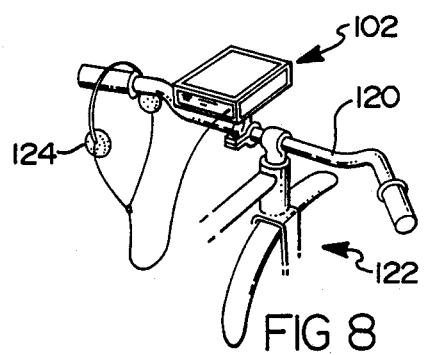

AUDIO EQUIPMENT CARRIER ASSSEMBLY FOR HANDLEBARS

TECHNICAL FIELD

This invention relates generally to audio equipment carriers for handlebars, and more particularly relates to a removable platform carrier assembly for containing personal radios, televisions, compact disc players and the like.

BACKGROUND OF THE INVENTION

Traditionally, equipment carriers are attached to the handlebars of bicycles and motorcycles and have been used for storage of different supplies and for carrying large articles which could not be carried in the pockets of the bicycle or motorcycle operator. Recently, with the popularity of Walkman-style radios (Walkman is Registered Trademark of Sony Corporation), bicycle and motorcycle operators have wanted to listen to music from these Walkman-type radios, compact disc players and televisions. In the past, because there has been no place on a bicycle for carrying the bulk of the stereo equipment, the bicycle operator has attached the radio to his body, and wears the headphone set to receive the audio signals from the stereo. Problems have been experienced with this method, however, because the radio itself is too bulky to be easily attached to the body of the operator.

Consequently, people have attempted to strap the radio or other audio equipment to the front of the bicycle, without much success. These conventional devices have experienced problems due to turning corners, hitting bumps in the road, and being poorly attached to the vehicle. Carrying devices produced by such prior art methods are inherently unstable due to the manner in which they attach to the bicycle.

Conventional carrying devices are limited in that they are not useful for holding the new, Walkman-style audio equipment onto the bicycle during operation. Attempts in the past to produce carrying articles have met with a certain degree of failure because the carrying article was not specifically designed to contain the recently popularized Walkman-style stereos and other audio equipment.

Radio carriers which enable a bicycle or motorcycle operator to use a personal transistor radio are known, but they are not specific for the popular radios which are utilized by many of today's cyclists. Certain carriers which have met with success incorporate built-in speaker carrier units attached to the bicycle or motorcycle and have been disclosed in various other patents. Examples of previous attempts to provide a adequate carrying system for a radio or the like are described in the following patents.

U.S. Pat. No. 4,662,547 issued May 5, 1987 to Villanueva et al. discloses an audio equipment carrier having built-in speakers. The speakers project rearward from the handlebars and are on opposite sides of a front fork control arm. The carrier has a flat top and the audio equipment is held thereon by a releasable strap. A plug and leads provide electrical communication between the audio equipment and the two built-in speakers.

U.S. Pat. No. 4,756,454 issued July 12, 1988 to Villanueva et al. is a continuation-in-part of the above-mentioned '547 patent, and discloses, besides the audio equipment carrier with built-in speakers, equipment to carry a battery and audio amplifiers to enhance the sound produced by the audio equipment. A novel strap and buckle combination is also disclosed.

U.S. Pat. No. 4,754,901 issued July 5, 1988 issued to Villanueva et al. is a division of the '454 patent mentioned above. An audio equipment carrier is again disclosed, and another embodiment of the strap and buckle apparatus is disclosed.

U.S. Pat. No. 4,798,318 issued Jan. 17, 1989 to Cannondale Corporation discloses a bicycle handlebar carrier bag comprising a bracket adapted to be fastened immovably to the bicycle handlebars. Further included is a bag of durable flexible material and a substantially rigid unitary three dimensional frame received within the frame. It does not appear from the disclosure that the carrier bag assembly is designed to carry radios, but rather other stored items.

U.S. Pat. No. 3,380,698 issued Apr. 30, 1968 to Goldberg et al. discloses a bicycle holder for transistor radios having two pairs of superimposed brackets structured for relative longitudinal shifting within predetermined limits to embracively support a small sized radio.

U.S. Pat. No. 3,193,232 issued July 6, 1965 to Hatcher discloses a radio bracket or holder for a small self-contained transistor radio in which the holder or bracket is easily attached to the handlebar of a bicycle, motorcycle or other like vehicle.

U.S. Pat. No. 2,588,671 issued Mar. 11, 1952 to Tringali discloses a holder for a radio on vehicle handlebars including a flat plate adapted to be secured to a radio and means for attaching it to the handlebars.

It is therefore a primary object of the present invention to provide an audio equipment carrier device in accordance with the present invention which will carry a personal Walkman-style stereo or radio system in a location on the handlebars of a bicycle or the like such that the headphones may easily be worn by the bicycle operator.

It is another object of the present invention to provide an audio equipment carrier device which is easily removable from the bicycle to prevent theft.

SUMMARY OF THE INVENTION

In accordance with a preferred embodiment of the invention, these and other objects and advantages are addressed as follows. An audio equipment carrier assembly device capable of mounting a personal stereo on the handlebars or other support members of a bicycle, motorcycle or the like is made of a top and a bottom portion capable of receiving and containing therein the personal stereo. Disclosed are various attachments for accessories, including speakers and headphones, as well as various means for mounting and removing the carrier assembly from a platform means attached to the handlebars of the bicycle.

A carrier assembly body is disclosed for adaptation to contain personal Walkman-style radios, stereos, cassette tape players, televisions, compact disc players and the like onto the handlebars of a vehicle. The carrier assembly body includes a top and a bottom portion, wherein the top portion has openings in its sides for access to the stereo equipment contained therein. The top portion may be attached to the bottom portion by a hinge to enable removal of the stereo equipment.

Included in my inventive concept is a platform means atop a band to be tensioned in a loop around the handlebar to frictionally engage the platform means and to allow for removably mounting the carrier assembly onto the handlebars. Also included is a means for releasably securing the audio visual equipment carrier assembly onto the platform in positive engagement, said means may include various attachment methods such as VELCRO ( a Registered Trademark of Velcro U.S.A. Inc.), a hook and eye fastening material, a female portion on the carrier assembly body to be received by a male clip on the platform means, or any other conventional means of attachment.

The carrier assembly body may further include a means for adjusting the interior dimension of the carrier assembly so that it may be adapted for various sizes of personal audio equipment. The means for interior dimension adjustment may include slots in the top and bottom portion of the carrier assembly accompanied by spacing bars for holding the personal audio equipment in a secured position. Further envisioned are foam fillers or the like.

In another embodiment of the present invention, a carrier assembly device constructed in accordance with the present invention may further include clips on either side of the top portion of the carrier assembly which mate with a speaker box assembly. The speaker box assembly is also adapted to receive varying sizes of speakers for use with the personal audio equipment to be contained within the carrier assembly. Such speakers are generally available in the same stores as the personal stereos.

In yet another embodiment of the present invention, a headphone clip is attached on the front of the top portion of the carrier assembly body for receiving the headphones of the audio equipment when the operator of the bicycle, motorcycle or other vehicle desires to remove the headphones from his or her head. The headphone clip device is capable of securing the headphones in a fashion such that the headphones will remain secure on the carrier assembly during riding of the vehicle.

BRIEF DESCRIPTION OF THE DRAWINGS

FIG. 3a is a perspective view of the hinge portion of the carrier assembly

FIG. 4 is a front elevational view of the carrier assembly device illustrating the placement of the female receiving portion for the clip means of attachment;

FIG. 5 is a side elevational view showing in phantom the slot created as the female receiving portion for the clip means;

FIG. 6 is a bottom plan view of the carrier assembly body illustrating the clip means attached to the bottom portion of the carrier assembly device;

FIG. 7 shows a perspective exploded view of an assembly of one embodiment of the present invention illustrating the top and bottom portion of the carrier assembly body;

FIG. 8 is an illustration of another embodiment of the invention showing the carrier assembly body as mounted on a bicycle; and FIG. 9 is a side cross-sectional view of the mounting loop of the platform means as it may be mounted on the handlebars.

DETAILED DESCRIPTION OF THE INVENTION

Figure 1:
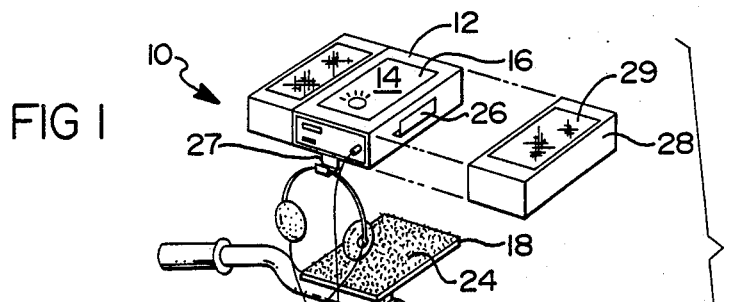
FIG. 1 shows a perspective view of the inventive device constructed in accordance with the present invention, wherein the carrier assembly device is attached to the handlebar of a bicycle.

Referring first to FIG. 1, a carrier assembly device is generally denoted by the numeral 10. The audio equipment carrier assembly device includes a carrier assembly body 12, for containing a personal Walkman-style radio 14. Opening 16 in the top of the carrier assembly body 12 allows for access of the controls of personal stereo 14. A platform means 18 includes a band 20 to be tensioned in a loop around a handlebar 22 on the front fork arm of a bicycle, motorcycle or other like vehicle, to frictionally engage the platform means and to allow for removable mounting of carrier assembly 12 onto handlebars 22. However, the carrier assembly may be attached to any convenient support member on the vehicle. A means 24 for releasably securing the bottom portion of the audio equipment carrier assembly 12 onto said platform means 18 is illustrated in FIG. 1 showing VELCRO (A registered trademark of Velcro U.S.A. Inc.) or any other generic hook and eye fastening material. Carrier assembly 10 also may include speaker clips 26 on the side of carrier assembly body 12 for attachment of a speaker assembly 28 including speakers 29. Furthermore, a headphone clip 27 may be included on the front of the carrier assembly for receiving headphones when the operator of the bicycle or motorcycle desires to remove them from his head.

Figure 2:
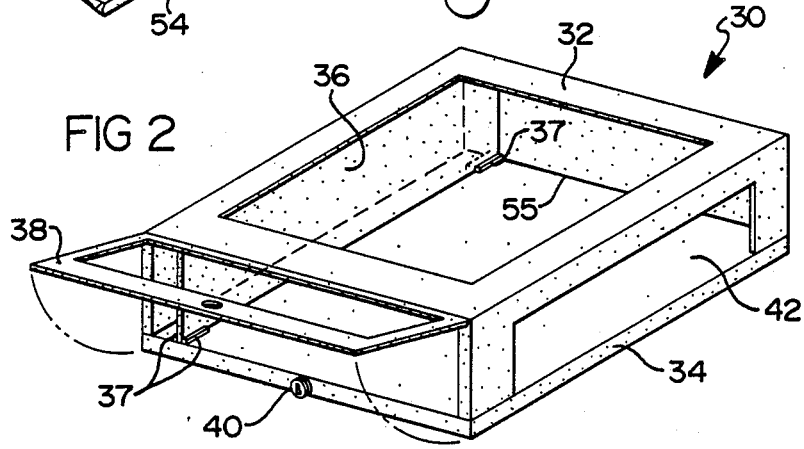
FIG. 2 illustrates a perspective view of one embodiment of the inventive device where the front of the carrier assembly device includes a lock and key for anti-theft protection.

Referring next to FIG. 2, another embodiment including a carrier assembly body 30 is shown which includes generally a lock box assembly. Carrier assembly 30 includes a top portion 32, and a bottom portion 34. The top portion 32 is attached to the bottom portion 34 by a hinge 55 which is a living hinge in the form of a longitudinal groove in the carrier assembly body. The hinge enables removal and installation of audio equipment, which is not shown in this Figure. There is a flip-up front panel 38 which includes an opening to receive lock 40 so that the audio equipment may be locked within the carrier assembly 30. Openings 42 are located on the top and sides of carrier assembly 30 so that adjustments may be made to the audio equipment. A spacer bar 36 is shown in place and is held by slot 37. While a spacer bar to adjust the dimension of the interior of the carrier assembly is shown in this embodiment, it must be realized by one of ordinary skill in the art that the spacer bar can be utilized in any of the embodiments.

Figure 3A:
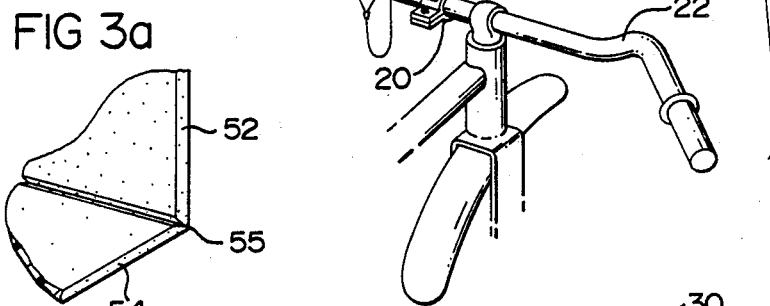
FIG. 3a is a perspective view of the longitudinal groove defining a living hinge.
Figure 3:
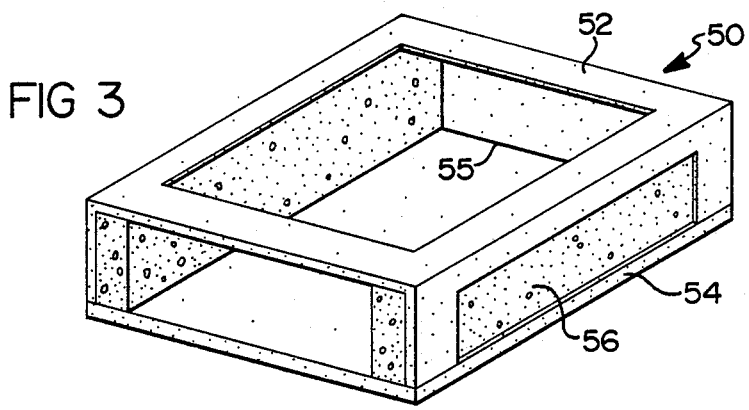
FIG. 3 is a perspective, view of another embodiment of the invention wherein at least one foam maybe used to accommodate varying sizes of personal stereos, radios, etc.

Looking now to FIG. 3, carrier assembly body 50 is shown including a top portion 52 and a bottom portion 54. As the inventor has imagined that varying sizes of Walkman-style stereos will be used with the same carrier assembly, the interior dimension of the carrier assembly must be adapted and sized for various sized personal stereos, radios, cassette tape players, portable compact disc players and the like. Therefore, dimension adjuster 56 is shown in place within carrier assembly body 50. There are many conventional means for adjusting the interior dimension of carrier assembly 50, although ones of special interest include foam fillers and the like. One of the preferred embodiments includes the placement of slots 37 in the floor and ceiling of carrier assembly body 50 for receiving spacer bars 36 as described hereinabove for FIG. 2, which are adapted in size to be complementary to the interior slots. In addition, the carrier assembly body 50 may be sized and adapted to receive and contain specific audio equipment selected from the group consisting of personal stereos, radios, televisions, portable compact disc players, Walkman-type radios and stereos, and personal cassette tape players. Hinge 55 will be described further below with reference to FIG. 3a.

FIG. 3a illustrates the hinge as shown in FIG. 3 in an open position. Top portion 52 of the carrier body assembly and bottom portion 54 are connected by a hinge 55 which is defined by a longitudinal groove in the material, the same being called a "living hinge". As one can imagine, the living hinge can be replaced by any form of conventional hinge, although the living hinge 55 would simplify manufacturing. Furthermore, the hinge may appear at the top of the carrier assembly body 55, or on the bottom, or on one of the sides.

With combined reference to FIGS. 4, 5, 6 and 8, another embodiment can be seen for attaching the bottom portion of the carrier assembly body of FIGS. 4 through 7 to the platform means as shown in FIG. 9, which is thereafter attached to the bicycle handlebars or other support member. With reference first to FIG. 6, there can be seen the bottom portion 100 of a carrier assembly 102. A female clip receiving means 108 is illustrated. Male protrusions 107 mate with female indentations of a male clip means 131 described hereinbelow with reference to FIG. 9. In FIG. 5, a front elevation view of the carrier assembly 102 shows the female receiving portion 108 designed to receive the male clip 131 as shown in FIG. 9. FIG. 5 is a side elevation view of a carrier assembly body 102 showing the female receiving portion 108 for male clip 131.

Referring now to FIG. 7, yet another embodiment of the carrier assembly body 102 is illustrated in which a top portion 110 is shown as attached to a bottom portion 112 by screws 114 through holes 116. In this embodiment, the radio or other device is slipped through the front or side of the carrier assembly 102 and held in place by any conventional means.

FIG. 8 shows the carrier assembly body 102 of FIG. 7 as assembled on the handlebars 120 of a bicycle 122. Headphones 124 are shown resting upon handlebars 120.

A tension band for attaching the carrier assembly device to the handlebars is illustrated in FIG. 9. The tension band 130 is tensioned in a loop around the handlebar 120 to allow for removably mounting the carrier assembly onto the handlebars. As shown, a male clip means 131 extends from band 130 and is shaped to be received by female clip receiving means 108 as described above with reference to FIGS. 4, 5, and 6. Included therein are female indentations to mate with the male protrusions 107 shown in FIG. 4. Therefore, bottom portion 100 from FIG. 6 is shown in place as clipped onto and over male clip 131. Traditionally, a nut and bolt arrangement 134 is utilized to increase the tension for frictional engagement, although one of ordinary skill in the art will be familiar with other means for attachment.

Thus, there is provided in accordance with the present invention, an audio equipment carrier assembly for attachment to handlebars or other support members which allows the operator of a bicycle, motorcycle or the like to attach his personal stereo to the front of his vehicle while allowing the headphone set to be worn by the operator. This is much preferable to attempting to carry the audio equipment either on the body of the person operating the vehicle, or by loosely attaching in a basket on the front of the vehicle. While my invention has been described in terms of a specific embodiment, it must be appreciated that other embodiments could readily be adapted by one skilled in the art. Accordingly, the scope of my invention is to be limited only by the following claims.

I claim:

1. An audio equipment carrier assembly for attachement to handlebars or other support members, comprising:
   a carrier assembly body adapted to contain either a personal radio, television, or compact disc player, said carrier assembly including a top portion and a bottom portion, said top portion having openings therein for access to the audio equipment to be contained therein, and said top portion being hingably attached to the bottom portion to enable removal of the audio equipment;
   a platform means attached atop a tension band to be looped around the handlebar or other support member to frictionally engage the platform means to the handlebar and to allow for removably mounting said carrier assembly onto said handlebars; and
   a means for releasably securing the bottom portion of the audio equipment carrier assembly onto said platform means.

2. A carrier assembly as in claim 1, wherein said means for releasably securing the audio carrier equipment onto said platform includes a VELCRO attachment means.

3. A carrier assembly as in claim 1, further comprising a speaker box assembly to be attached by clips to either side of the top portion of the carrier assembly, said speaker box assembly being adapted to receive varying sizes of speakers which are adapted for use with the personal radio to be contained within the carrier assembly.

4. A carrier assembly as in claim 1, further comprising a headphone clip on the carrier assembly body for receiving the headphones of the audio equipment.

5. A carrier assembly as in claim 1, further comprising a lock and key portion incorporated into the carrier assembly body for locking the top portion over the bottom portion such that the audio equipment contained therein is lockably attached to the handlebars.

6. The carrier assembly of claim 1, wherein said carrier assembly body further includes interior adjustment means for adapting the carrier assembly to varying sizes of audio equipment including personal radios of differing dimension.

7. The carrier assembly of claim 6, wherein said interior adjustment means includes spacer bars sized to be placed within the carrier assembly and slots in the top and bottom portion of the carrier assembly body for receiving the spacer bars which are adapted in size to be complementary to the interior slots.

8. The carrier assembly of claim 6, wherein said interior adjustment means includes foam fillers.

* * * * *